United States Patent
Tateno

(10) Patent No.: US 8,862,719 B2
(45) Date of Patent: Oct. 14, 2014

(54) DATA TRANSMISSION/RECEPTION APPARATUS AND METHOD FOR INSERTING AND EXTRACTING MAINTENANCE MANAGEMENT DATA

(75) Inventor: Yasushi Tateno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 961 days.

(21) Appl. No.: 12/328,264

(22) Filed: Dec. 4, 2008

(65) Prior Publication Data

US 2009/0164627 A1    Jun. 25, 2009

(30) Foreign Application Priority Data

Dec. 21, 2007    (JP) ................................ 2007-330729

(51) Int. Cl.
| | | |
|---|---|---|
| *G06F 15/173* | (2006.01) | |
| *G06F 11/00* | (2006.01) | |
| *H04L 29/08* | (2006.01) | |
| *H04L 12/24* | (2006.01) | |

(52) U.S. Cl.
CPC .............. *H04L 12/24* (2013.01); *H04L 69/324* (2013.01); *H04L 41/00* (2013.01)
USPC ....................................... 709/224; 370/241.1

(58) Field of Classification Search
CPC ........ H04L 12/24; H04L 41/00; H04L 69/324
USPC .............................. 709/224; 370/241.1, 236.2
See application file for complete search history.

(56) References Cited

U.S. PATENT DOCUMENTS

| | | | | |
|---|---|---|---|---|
| 6,957,269 | B2 * | 10/2005 | Williams et al. | 709/235 |
| 7,792,091 | B2 * | 9/2010 | Sahinoglu et al. | 370/349 |
| 2004/0184474 | A1 * | 9/2004 | Kim et al. | 370/445 |
| 2008/0049621 | A1 * | 2/2008 | McGuire et al. | 370/236.2 |
| 2008/0049629 | A1 * | 2/2008 | Morrill | 370/250 |
| 2008/0219172 | A1 * | 9/2008 | Mohan et al. | 370/241.1 |

FOREIGN PATENT DOCUMENTS

| | | |
|---|---|---|
| JP | 11-243391 | 9/1999 |
| JP | 2003-18162 | 1/2003 |

OTHER PUBLICATIONS

Japanese Office Action issued Jan. 4, 2012 in corresponding Japanese Patent Application No. 2007-330729.

* cited by examiner

*Primary Examiner* — Chirag R Patel
(74) *Attorney, Agent, or Firm* — Staas & Halsey LLP

(57) ABSTRACT

A data transmission/reception apparatus including a network layer device section for performing a process corresponding to a physical layer of an OSI reference model is provided. The apparatus includes a maintenance management data insertion/extraction section for inserting maintenance management data into data to be transmitted, transmitting the data to be transmitted, and extracting the maintenance management data from received data, wherein the maintenance management data insertion/extraction section performs the insertion and extraction of the maintenance management data with respect to the network layer device section.

1 Claim, 9 Drawing Sheets

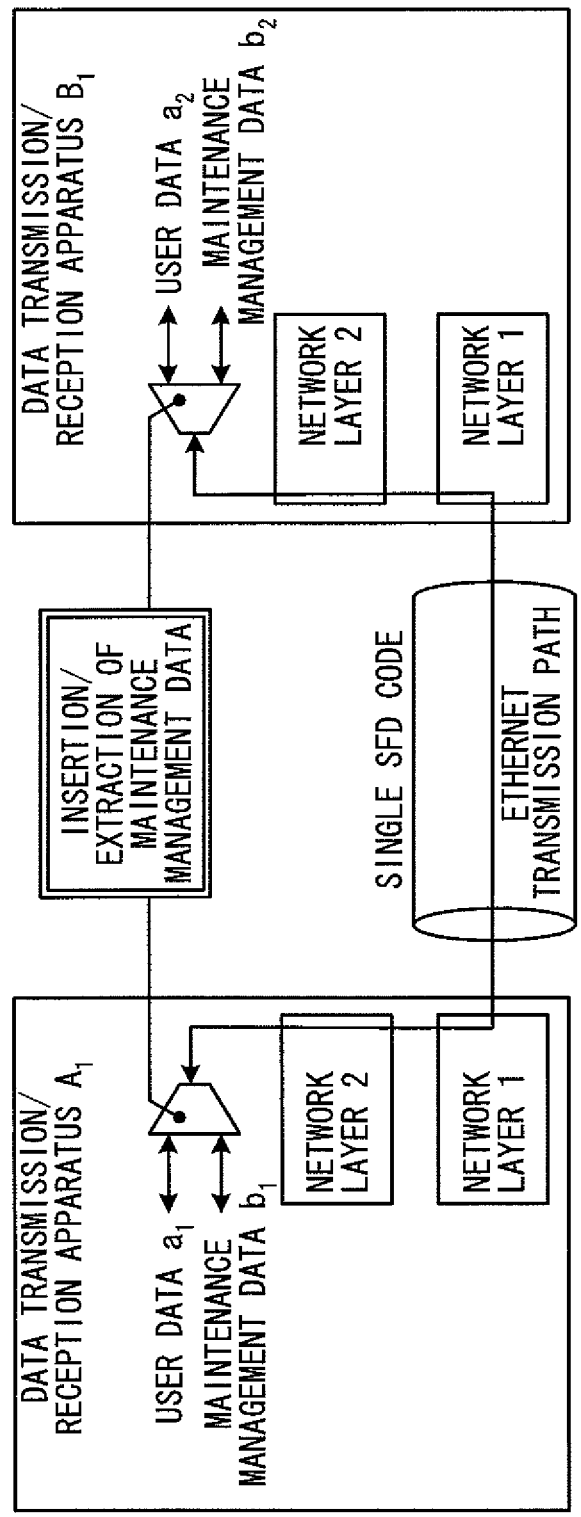

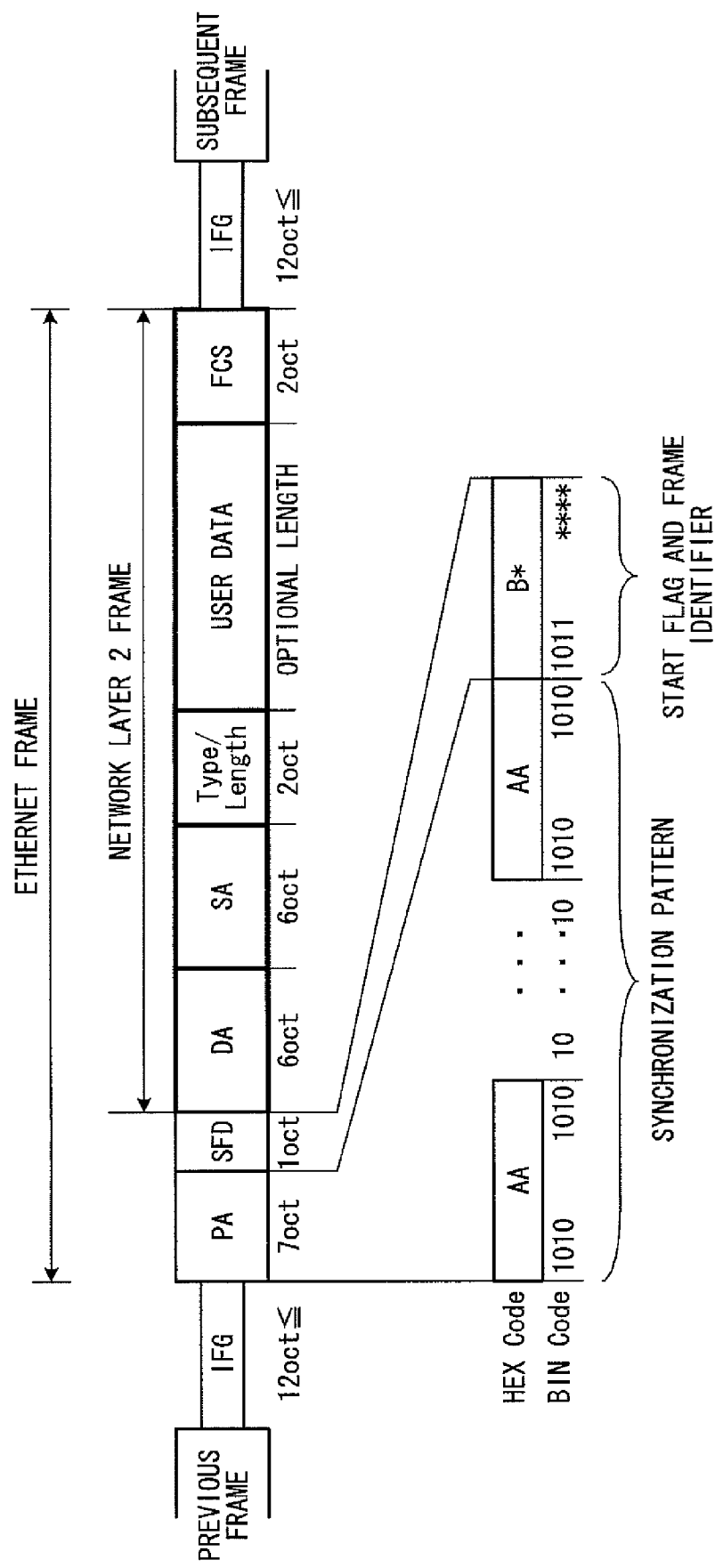

FIG. 6

| HEX | SFD CODE BIN | | APPLICATION | EXAMPLE OF SETTING OF ETHER-OAM (SET OPTIONALLY BETWEEN NODES) |
|---|---|---|---|---|
| AB | 1010 | 1011 | CONVENTIONAL CODE (IEEE802.3) — USER FRAME | SETTING IS NOT POSSIBLE |
| B0 | | 0000 | USER FRAME | — |
| B1 | | 0001 | EXTENDED CODE ACCORDING TO THE PRESENT INVENTION (LOWER IN PRIORITY THAN USER FRAME) · OPERATION ADMINISTRATION AND MAINTENANCE (OAM) FRAME OR · PROTOCOL CONTROL FRAME etc. | FOR Link Layer OAM (IEEE 802.3ah) |
| B2 | | 0010 | | Reserved |
| B3 | | 0011 | | Reserved |
| B4 | | 0100 | | Reserved |
| B5 | | 0101 | | Reserved |
| B6 | | 0110 | | Reserved |
| B7 | 1011 | 0111 | | FOR LACP |
| B8 | | 1000 | (HIGHER IN PRIORITY THAN USER FRAME) · OPERATION ADMINISTRATION AND MAINTENANCE (OAM) FRAME OR · PROTOCOL CONTROL FRAME etc. | FOR LA Marker |
| B9 | | 1001 | | Reserved |
| BA | | 1010 | | Reserved |
| BB | | 1011 | | Reserved |
| BC | | 1100 | | Reserved |
| BD | | 1101 | | Reserved |
| BE | | 1110 | | Reserved |
| BF | | 1111 | | Reserved |

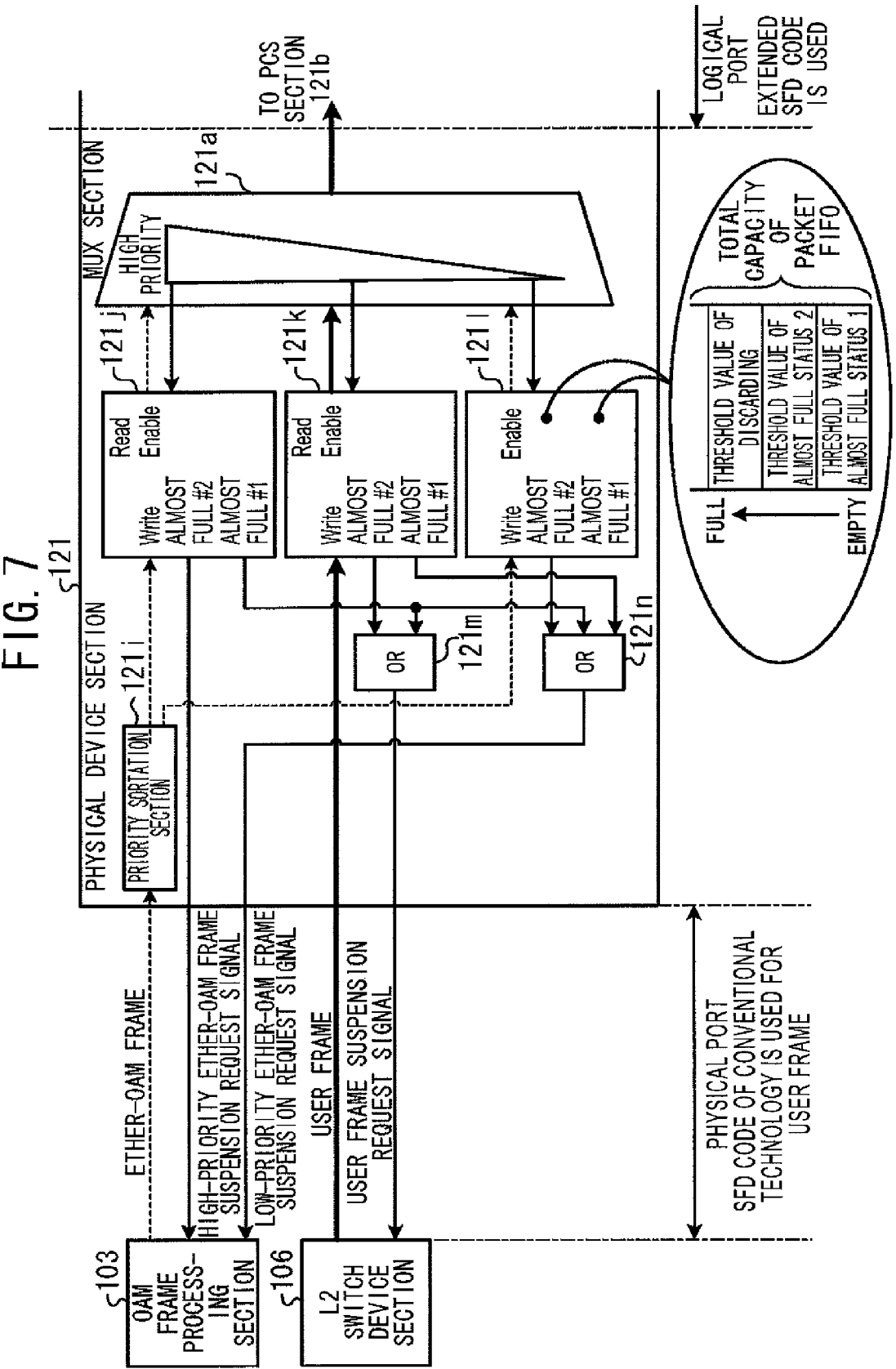

DATA TRANSMISSION/RECEPTION APPARATUS AND METHOD FOR INSERTING AND EXTRACTING MAINTENANCE MANAGEMENT DATA

CROSS-REFERENCE TO RELATED APPLICATION(S)

This application is related to and claims priority to prior Japanese Patent Application No. 2007-330729, filed on Dec. 21, 2007 and incorporated herein by reference.

BACKGROUND

1. Field

The embodiments discussed herein are directed to a data transmission/reception apparatus for inserting maintenance management data into data to be transmitted, transmitting the data to be transmitted, and extracting the maintenance management data from received data, and to a method for inserting and extracting the maintenance management data.

2. Description of the Related Art

In a data transmission/reception apparatus of a computer network (hereinafter referred to as a network) using a standard such as Ethernet or the like, there has been conventionally adopted a method which maintains and manages the computer communication line by using maintenance management data to be added to communication data. Since the data transmission/reception apparatus on a reception side can extract the maintenance management data from the communication data, and detect a network failure such as a link failure based on the maintenance management data, it becomes possible deal with the failure.

Technologies using Ethernet technology have been increasingly applied to a WAN (Wide Area Network) as physical layer devices have become capable of a longer-distance communication, and the transmission and exchange of maintenance management information have been increasingly important, for example, as in the case with a SONET/SDH (Synchronous Optical NETwork/Synchronous Digital Hierarchy) line.

An example of the maintenance management data in Ethernet is an Ether-OAM (Operation Administration and Maintenance) frame represented by IEEE Standard 802.3ah that is normalized. The Ether-OAM frame may be inserted into the same transmission path as that for user data, and may be extracted from the same transmission path. The Ether-OAM frame is a frame in the same network layer as a user Ethernet frame, and is inserted and extracted in a network layer 2.

Conventionally, a maintenance management system and a maintenance management method is disclosed in which the network can be maintained and managed without affecting a communication traffic by inserting the maintenance management data in a guard time between communication frames in a data link layer (network layer 2) and higher in a 7 Layer model for OSI ((Open Systems Interconnection), also referred to as the OSI reference model) and performing communication.

SUMMARY

It is an aspect of the embodiments discussed herein to provide a data transmission/reception apparatus including a network layer device section for performing a process corresponding to a physical layer of an OSI reference model, and a maintenance management data insertion/extraction section for inserting maintenance management data into data to be transmitted, transmitting the data to be transmitted, and extracting the maintenance management data from received data, wherein the maintenance management data insertion/extraction section performs the insertion and extraction of the maintenance management data with respect to the network layer device section.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1A illustrates an insertion and extraction of maintenance management data in a conventional data transmission/reception apparatus;

FIG. 5 illustrates a format of an extended Ethernet frame according to an exemplary embodiment;

FIG. 6 illustrates an example of the extension of an SFD code according to an exemplary embodiment;

FIG. 7 illustrates a section of the data transmission/reception apparatus according to an embodiment.

DETAILED DESCRIPTION OF THE EMBODIMENTS

Figure 1B:
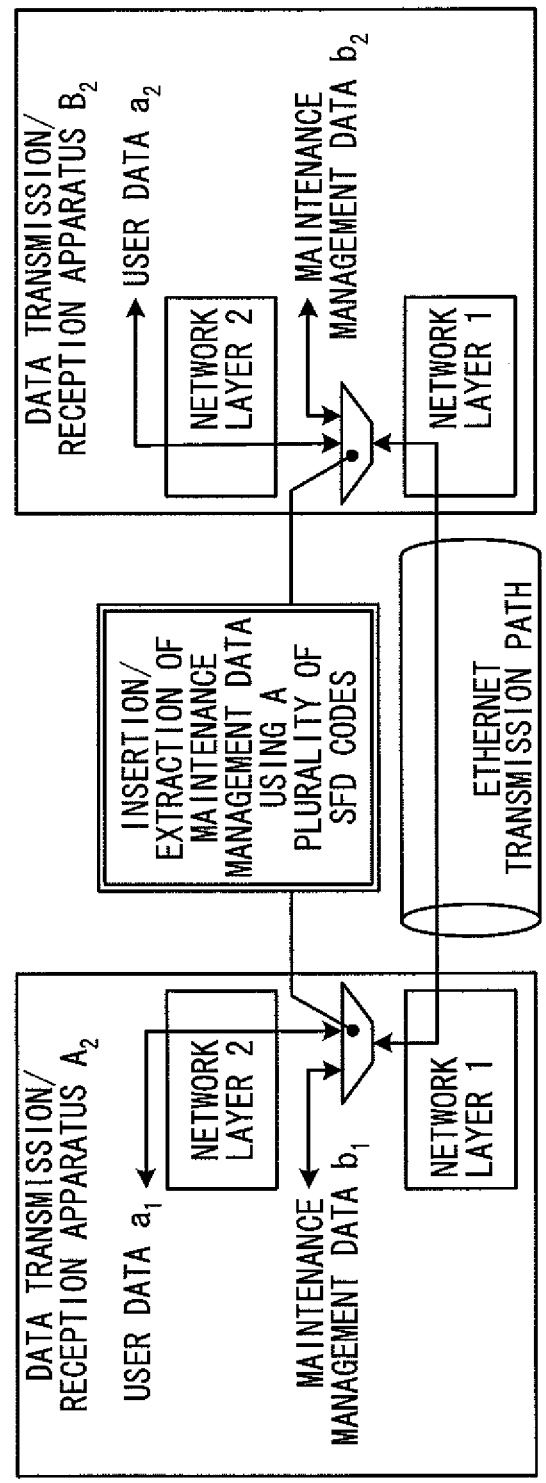
FIG. 1B illustrates an insertion and extraction of maintenance management data in a data transmission/reception apparatus according to an embodiment.

Conventionally, in the maintenance and management of a network using Ethernet or the like, when the insertion and extraction of maintenance management data represented by an Ether-OAM frame are performed at an uppermost level portion in a network layer 2 in conformity with IEEE 802.3 as a technical standard, the circuit structure of a data transmission/reception apparatus becomes complicated so that an advantage of Ethernet that the network can be easily constructed by using small and inexpensive apparatuses may be impaired.

In the exemplary embodiments illustrated a description will be given to a data transmission/reception apparatus, a device for inserting and extracting maintenance management data, and a program for inserting and extracting the maintenance management data which are associated with an interface device for connecting a computer device to an Ethernet network which transmits an Ethernet frame. However, the network is not limited to Ethernet, but may be associated, for example, with the interface device for connecting the computer device to any network performing the maintenance and management by inserting and transmitting the maintenance management data into a frame, and extracting the maintenance management data.

Insertion and extraction of maintenance management data in a conventional data transmission/reception apparatus and exemplary insertion and extraction of maintenance management data in a data transmission/reception apparatus according to the embodiment will be described in comparison with each other.

FIG. 1A illustrates insertion and extraction of the maintenance management data in the conventional data transmission/reception apparatus. As illustrated in FIG. 1A, a conventional data transmission/reception apparatus A1 for transmitting and receiving an Ethernet frame and a data transmission/reception apparatus B1 having the same structure as the data transmission/reception apparatus A1 are opposed to each other via an Ethernet transmission path.

Into the Ethernet frame, for example, the maintenance management data represented by the Ether-OAM frame can be inserted. The maintenance management data is the same network layer 2 frame (MAC (Media Access Control) frame) as user data, and either the maintenance management data or the user data can be inserted into one Ethernet frame. In addition, the Ethernet frame has a field storing a single code indicating the start of the network layer 2 frame which is called SFD (Start of Frame Delimiter).

As illustrated in FIG. 1A, after the Ethernet frame which has been transmitted through the Ethernet transmission path has passed network layers 1 and 2, the data transmission/reception apparatus A1 extracts user data a1 or maintenance management data b1 from the Ethernet frame. Similarly, the data transmission/reception apparatus B1 also extracts user data a2 or maintenance management data b2 from the Ethernet frame at a stage subsequent to the network layers 1 and 2.

However, in the line monitoring of Ethernet, when the insertion and extraction of the maintenance management data may be performed in the upper level portion of the network layer 2, the circuit structure of the data transmission/reception apparatus becomes complicated. As a result, an advantage of Ethernet that the network can be easily constructed of data transmission/reception apparatuses each having a small, inexpensive, and simple structure may be impaired. Therefore, in order to solve the problem, a data transmission/reception apparatus as illustrated in FIG. 1B is provided.

FIG. 1B illustrates insertion and extraction of the maintenance management data in the data transmission/reception apparatus according to an embodiment. As illustrated in FIG. 1B, a data transmission/reception apparatus A2 for transmitting and receiving the Ethernet frame according to an exemplary embodiment and a data transmission/reception apparatus B2 that may have a similar structure as the data transmission/reception apparatus A2 are opposed to each other via the Ethernet transmission path.

The data transmission/reception apparatuses A2 and B2 are able to identify whether the network layer 2 frame inserted in the Ethernet frame is the user data or the maintenance management data by the extension by, for example, having a plurality of SFD codes. When the network layer 2 frame is identified as the maintenance management data, after the Ethernet frame which has been transmitted through the Ethernet transmission path has passed the network layer 1, maintenance management data b1 is extracted from the Ethernet frame.

On the other hand, when the network layer 2 frame inserted in the Ethernet frame is identified as the user data, after the Ethernet frame which has been transmitted through the Ethernet transmission path has passed the network layers 1 and 2, user data a1 is extracted from the Ethernet frame.

Similarly, the data transmission/reception apparatus B2 also extracts maintenance management data b2 from the Ethernet frame after the stage subsequent to the network layer 1, and extracts user data a2 from the Ethernet frame immediately after the stage subsequent to the network layer 2.

With this arrangement, the circuit structure of the data transmission/reception apparatus is simpler so that advantages of Ethernet in that the network can be easily constructed of the data transmission/reception apparatuses each having the small, inexpensive and simple structure is not impaired.

Figure 2:
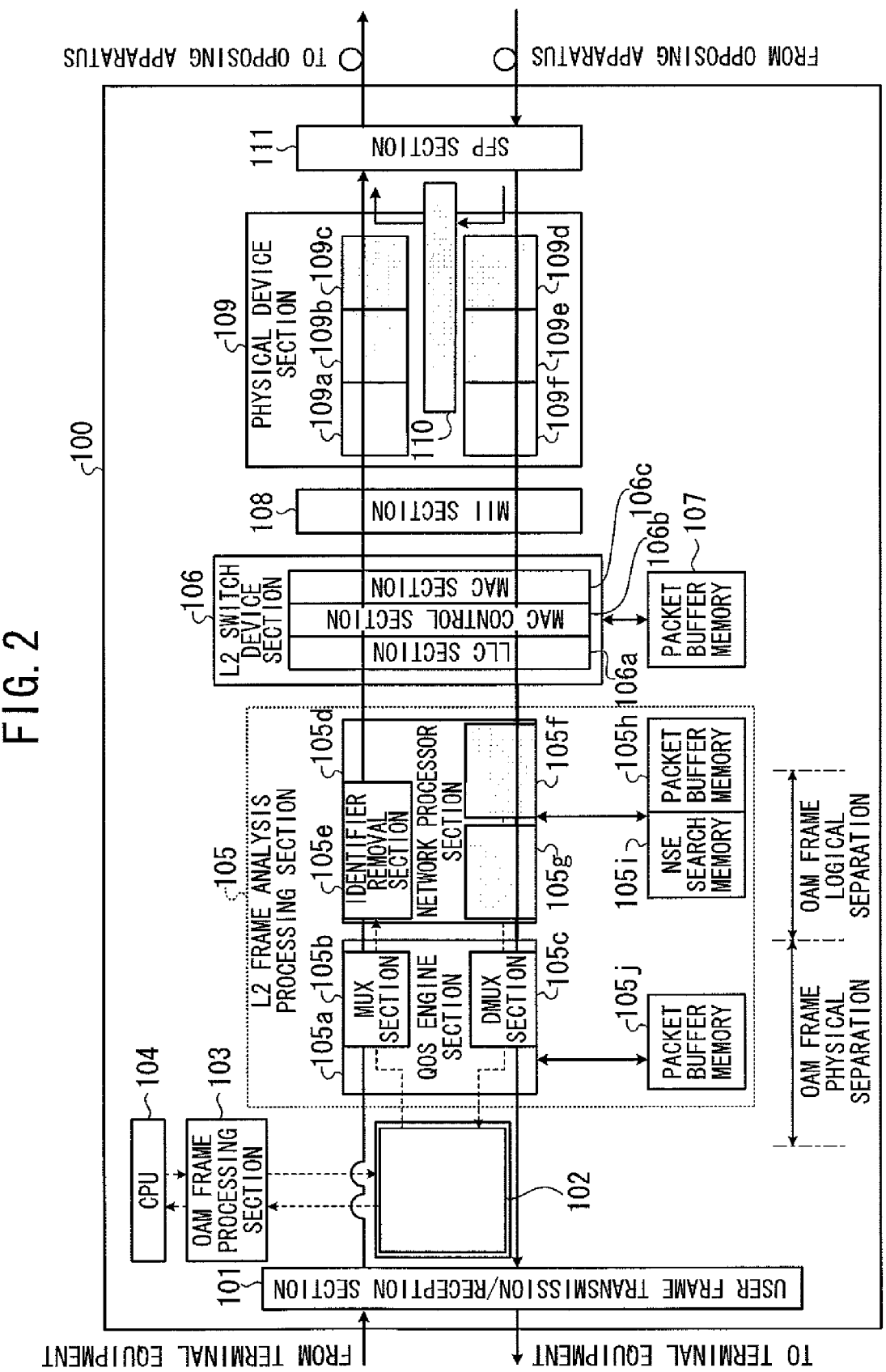
FIG. 2 illustrates a conventional data transmission/reception apparatus.

FIG. 2 illustrates a conventional data transmission/reception apparatus. In FIG. 2, it is assumed that an optical fiber such as 1000BASE-LX or the like is used as a transmission medium, and a copper structure (1000BASE-T, 100BASE-TX or the like) is omitted. Even when the transmission path has the copper structure, portions where an exemplary embodiment is applied may be the same.

As illustrated in FIG. 2, a user frame transmission path and a maintenance management data transmission path are multiplexed in the network structure where a conventional data transmission apparatus 100 is opposed to another data transmission apparatus 100 via the Ethernet transmission path.

The data transmission apparatus 100 includes a user frame transmission/reception section 101, an Ether-OAM frame transmission/reception section 102, an OAM frame processing section 103, a CPU (Central Processing Unit) 104 for performing the management of the network based on the maintenance management data, an L2 (Layer 2) frame analysis processing section 105, an L2 switch device section 106, a packet buffer memory 107, an MII (Media Independent Interface) section 108, a physical (PHY) device section 109, and an SFP (Small Form Factor Pluggable) section 111.

The CPU 104 may be connected with external terminal equipment (not illustrated) and transfers management information on the network to the terminal equipment. The terminal equipment includes a display section for displaying the management information on the network to a network manager. The terminal equipment also includes an input section for receiving an operation related to the network management from the network manager. The terminal equipment may transfer an instruction to the CPU 104 based on the input operation related to the network management.

The user frame transmission/reception section 101 is an interface for the data transmission/reception apparatus 100 to perform the transmission and reception of the user data with the terminal equipment or the like. The Ether-OAM frame transmission/reception section 102 is an interface for the OAM frame processing section 103 and the L2 frame analysis processing section 105 to perform the transmission and reception of the Ether-OAM frame.

The OAM frame processing section 103 reads the maintenance management data included in the Ether-OAM frame transferred from the Ether-OAM frame transmission/reception section 102, and transfers it to the CPU 104. Conversely, the OAM frame processing section 103 sets the maintenance management data transferred from the CPU 104 in the Ether-OAM frame.

The L2 frame analysis processing section 105, which may be c compliant with an Ethernet QOS (Quality Of Service), inserts the Ether-OAM frame into the Ethernet frame by a method similar to a QOS classification, and extracts the Ether-OAM frame from the Ethernet frame.

The L2 frame analysis processing section 105 includes a QOS engine section 105a, a packet buffer memory 105j for buffering a packet which may be connected to the QOS engine section 105a, a network processor section 105d, and a packet buffer memory 105h for buffering the packet and an NSE (Network Search Engine) search memory 105i which are connected to the network processor section 105d.

The QOS engine section 105a includes a MUX (MUltipleXer) section 105b for individually converting respective physical port information items of the Ether-OAM frame transferred from the Ether-OAM frame transmission/reception section 102 and the user data frame transferred from the user frame transmission/reception section 101 to logical port information items by adding identifiers thereto.

The QOS engine section 105a also includes a DMUX (DeMUltipleXer) section 105c which specifies the physical port for transferring, to either the Ether-OAM frame transmission/reception section 102 or the user frame transmission/reception section 101, the Ethernet frame which is transferred from the network processor section 105d, and is subjected to the addition of the logical port information in accordance with the identifier.

The network processor section 105d includes an identifier removal section 105e, a frame identification section 105f, and an identifier addition section 105g. The identifier removal section 105e removes the logical port information item added to the Ethernet frame transferred from the MUX section 105b of the QOS engine section 105a.

The frame identification section 105f identifies whether an inserted frame inserted in the Ethernet frame transferred from the L2 switch device section 106 is the user data frame or the Ether-OAM frame by referring to values of a Sub Type field, a Flags field, and a Code field in the network layer 2 frame (the Ether-OAM frame).

The identifier addition section 105g adds respective logical port information item to the user data frame or the Ether-OAM frame in accordance with the result of the identification by the frame identification section 105f.

The L2 switch device section 106 has an LLC (Logical Link Control) section 106a, an MAC control section 106b, and an MAC (Media Access Control) section 106c, and covers, together with the physical device section 109, basic functions of the data transmission apparatus.

The MII section 108 is an interface for connecting the L2 switch device section 106 and the physical device section 109 using various MIIs such as MII, GMII, SGMII, RGMII and the like.

The physical device section 109 includes a PCS (Physical Coding Sub layer) section 109a, a PMA (Physical Medium Attachment) section 109b, and a PMD (Physical Medium Dependent) section 109c on a transmission side.

The physical device section 109 includes a PMD section 109d, a PMA section 109e, and a PCS section 109f on a reception side. In addition, the physical device section 109 includes an Auto Negotiation section 110 for both transmission and reception.

The SFP section 111 performs the process for converting an electric signal to an optical signal, or the optical signal to the electric signal. The physical device section 109 covers a function of the network layer 1. The L2 switch device section 106 covers a function of the network layer 2. To the L2 switch device section 106, the packet buffer memory 107 for buffering a packet may be connected.

Conventionally, the L2 frame analysis processing section 105 includes the QOS engine section 105a, the packet buffer memory 105j connected to the QOS engine section 105a, the network processor section 105d, and the packet buffer memory 105h and the large-capacity NSE search memory 105i which are connected to the network processor section 105d.

Further, since a high-speed large-capacity data analyzing ability and a processing ability are required of the L2 frame analysis processing section 105, the circuit structure becomes complicated and power consumption becomes large, and the structure disadvantageously turns to be large in scale and high in cost. For example, the price of the L2 switch device section 106 of the data transmission/reception apparatus 100 is about 5 to 10 times the price of the physical device section 109, which is relatively low in cost. On the other hand, the L2 frame analysis processing section 105 has the price more than 100 times the price of the physical device section 109.

That is, since a data transmission/reception apparatus of a high-end class is required in order to perform the insertion and extraction of the maintenance management data, there has been the problem that the application to general Ethernet data transmission/reception apparatuses including an ONU (Optical Network Unit), a DSU (Digital Service Unit), a switching hub, a digital network house hold appliance, a personal computer, and the like has been difficult.

In other words, it has been a problem to be solved as how to start a virtuous cycle in which the Ethernet data transmission/reception apparatus rapidly becomes prevalent in many fields due to advantages of Ethernet which are easiness, compactness, and inexpensiveness so that services are diversified and prices are further lowered due to an increase in demand.

Figure 3:
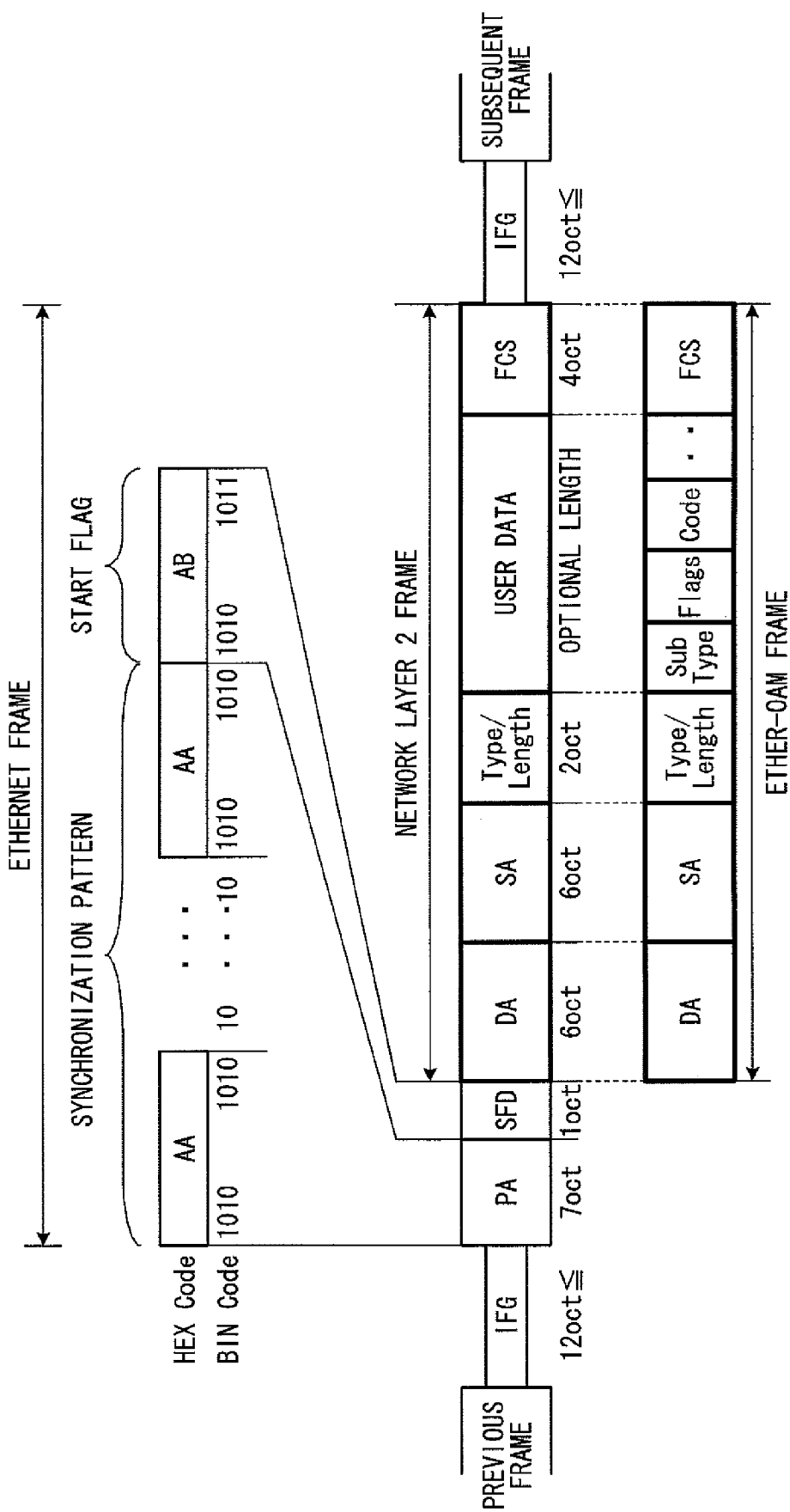
FIG. 3 illustrates formats of a conventional Ethernet frame and an Ether-OAM frame.

FIG. 3 illustrates the formats of the conventional Ethernet frame and the Ether-OAM frame.

The Ethernet frame has IFGs (Inter Frame Gap) each of which has at least 12 octets (1 octet=8 bits) between itself and a previous Ethernet frame and between itself and a subsequent Ethernet frame. The IFG is an idle region for absorbing a clock frequency deviation of Ethernet. One Ethernet frame includes a PA (Pre Amble) field of 7 octets, an SFD field of 1 octet, and a field for storing the network layer 2 frame with an optional length which is not longer than the maximum length regulated by the system.

When the network layer 2 frame is the user data, the network layer 2 frame includes a DA (Destination Address) field of 6 octets, an SA (Source Address) field of 6 octets, a Type/Length (type and length of the user data) field of 2 octets, a user data field with an optional length, and an FCS (Frame Check Sequence) field of 4 octets.

When the network layer 2 frame is the Ether-OAM frame (maintenance management data), the network layer 2 frame has, in addition to the same DA, SA, and Type/Length fields as provided in the user data, at least a Sub Type field for indicating an OAM type, a Flags field, and a Code field. Respective values in the Sub Type field, the Flags field, and the Code field are used to identify the Ether-OAM frame. The Ether-OAM frame also has the FCS field of 4 octets at its end in the same manner as in the user data.

Figure 4:
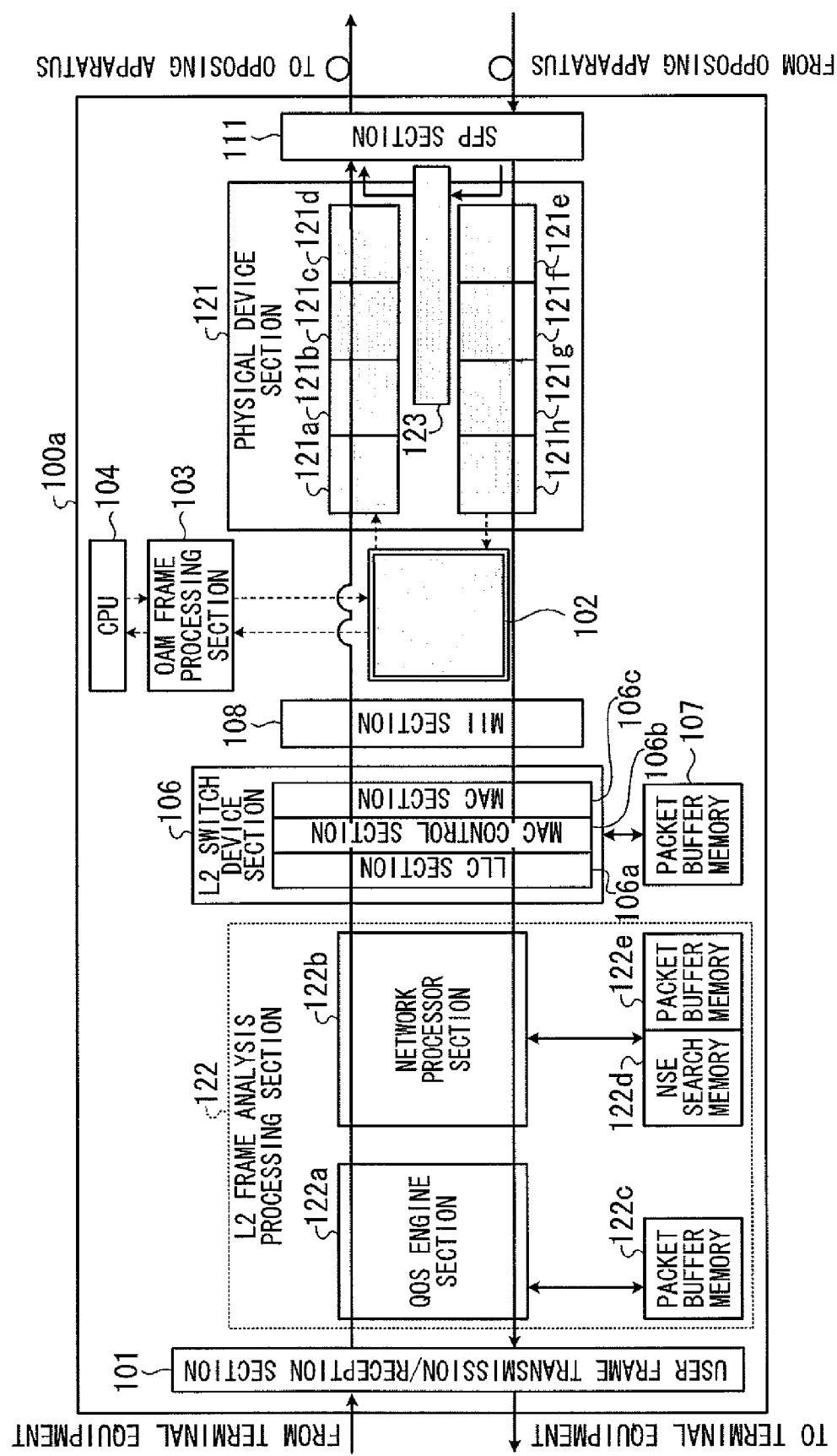
FIG. 4 illustrates a data transmission/reception apparatus according to an exemplary embodiment.

FIG. 4 is a functional block diagram showing the structure of the data transmission/reception apparatus according to an exemplary embodiment. As illustrated in FIG. 4, the user frame transmission path and the maintenance management data transmission path are multiplexed in the network structure where a data transmission apparatus 100a according to an exemplary embodiment is opposed to another data transmission apparatus 100 or data transmission apparatus 100a via the Ethernet transmission path. The data transmission apparatus 100a according to an exemplary embodiment implements the insertion and extraction of the maintenance management data in the network layer 1 by changing the transmission path of the maintenance management data in the conventional data transmission apparatus 100.

The data transmission apparatus 100a includes a user frame transmission/reception section 101, a physical (PHY) device section 121, an L2 frame analysis processing section 122, the L2 switch device section 106, the packet buffer memory 107, the MII section 108, the Ether-OAM frame transmission/reception section 102, the OAM frame processing section 103, and the CPU 104 for performing the management of the network based on the maintenance management data.

Since the user frame transmission/reception section 101, the L2 switch device section 106, the packet buffer memory 107, the MII section 108, and the SFP section 111 are the same as those in the conventional data transmission apparatus 100, the description thereof will be omitted.

The physical device section 121 includes an MUX (MUltipleXer) section 121a, a PCS section 121b, a PMA section 121c, and a PMD section 121d on the transmission side. In addition, the physical device section 121 includes a PMD section 121e, a PMA section 121f, a PCS section 121g, and a DMUX (DeMUltipleXer) section 121h on the reception side.

Further, the physical device section 121 includes an Auto Negotiation section 123 for both transmission and reception. The Auto Negotiation section 123 performs a process for determining whether or not the SFD code in the Ethernet frame is an extended SFD code. Since the PCS section 121b, the PMA section 121c, the PMD section 121d, the PMD section 121e, the PMA section 121f, and the PCS section 121g are the same as those in the conventional data transmission apparatus 100, the description thereof will be omitted.

The physical device section 121 can be implemented by adding a physical port for the output of the maintenance management data and a physical port for the output of the user frame (PHY (physical) function) to an ASSP (Application Specific Standard Product, a general-purpose LSI (Large Scale Integration) specialized for a specific function), an ASIC (Application Specific Integrated Circuit, an integrated circuit obtained by integrating circuits with a plurality of functions into a single circuit for a specific application), or a FPGA (Field Programmable Gate Array, an LSI in which firmware can be rewritten), and mounting a PHY macro, a logic circuit, or firmware for providing a function as the PHY device.

In other words, the physical device section 121 may be implemented only by changing the PHY macro, the logic circuit, or the firmware for providing the function as the PHY device when compared with the physical device section 109 of the conventional data transmission/reception apparatus 100. In addition, the physical device section 121 can be implemented using a one-chip integrated circuit.

The maintenance management data which is transferred from the CPU 104 and set in the Ether-OAM frame by the OAM frame processing section 103 is then transferred to the MUX section 121a of the physical device section 121 via the Ether-OAM frame transmission/reception section 102.

The MUX section 121a has physical ports for the user data and physical ports for the Ether-OAM frame which are transferred via the MII section 108. The MUX section 121a inserts the user data input from the physical port for the user data and the Ether-OAM frame input from the physical port for the Ether-OAM frame into the Ethernet frame and transfers it to the PCS section 121b. Then, the Ethernet frame is transmitted to the opposing data transmission/reception apparatus 100 or data transmission/reception apparatus 100a via the PMA section 121c, the PMD section 121d, and the SFP section 111.

The OMUX section 121h identifies the Ethernet frame transferred from the PCS section 121g using the extended SFD code, assigns the extracted user data to the physical port for the user data, and assigns the extracted Ether-OAM frame to the physical port for the OAM frame in accordance with the result of the identification.

The DMUX section 121h refers to the SFD field of the Ethernet frame which is transmitted from the opposing data transmission/reception apparatus 100 or data transmission/reception apparatus 100a via the SFP section 111, the PMD section 121e, the PMA section 121f, and the PCS section 121g, and determines whether or not the value of the SFD field is the value of the extended SFD field.

When the value of the SFD field is the value of the extended SFD field, and the value of the SFD field indicates the user data, the DMUX section 121h extracts the user data from the Ethernet frame and assigns it to the physical port for the user data. The user data assigned to the physical port for the user data is transferred to the L2 switch device section 106 via the MII section 108.

When the value of the SFD field is the value of the extended SFD field, and the value of the SFD field indicates the Ether-OAM frame, the DMUX section 121h extracts the Ether-OAM frame from the Ethernet frame, and assigns it to the physical port for the Ether-OAM frame. The Ether-OAM frame assigned to the physical port for the Ether-OAM frame is transferred to the Ether-OAM frame transmission/reception section 102.

The Ether-OAM frame transmission/reception section 102 transfers the Ether-OAM frame to the OAM frame processing section 103. Subsequently, the OAM frame processing section 103 transfers the maintenance management data read from the Ether-OAM frame transferred from the Ether-OAM frame transmission/reception section 102 to the CPU 104.

The L2 frame analysis processing section 122 of the data transmission/reception apparatus 100a according to an exemplary embodiment includes a QOS engine section 122a, a packet buffer memory 122c connected to the QOS engine section 122a, a network processor section 122b, and an NSE search memory 122d and a packet buffer memory 122e which are connected to the network processor section 122b, and are irrelevant to the processing of the Ether-OAM frame. Therefore, except for the case with a high-end data transmission/reception apparatus which performs a QOS management of many user flows, the L2 frame analysis processing section 122 in the user data path can be omitted and a more inexpensive structure utilized.

The data transmission/reception apparatus 100a according to an exemplary embodiment includes a simple structure where the Ether-OAM frame does not pass through the MII section 108, the L2 switch device section 106, the packet buffer memory 107, and the L2 frame analysis processing section 122.

FIG. 5 illustrates the format of the extended Ethernet frame according to an exemplary embodiment. As in the format of the conventional Ethernet frame illustrated in FIG. 3, the extended Ethernet frame is also the network layer 2 frame. The extended Ethernet frame has the DA field, the SA field, the Type/Length field, the user data field, the FCS field, the PA field to be used to establish synchronization of the layer 2 frame, the SFD field indicative of the start of the network layer 2 frame, and IFGs disposed between itself and the previous frame and between itself and the subsequent frame.

In the extended Ethernet frame, the value of the SFD field (SFD code) is extended from a single {AB [HEX]} to a plurality of codes other than {AB [HEX]}. For example, {B*} illustrated in FIG. 5 is an example of a code other than {AB [HEX]}, and is obtained by shifting {B [HEX]}={1011} in a start flag by 4 bits (shifted forward on a time axis).

The data transmission apparatus 100a according to an exemplary embodiment has a structure which is as inexpensive and simple as a conventional apparatus while having the function of transmitting maintenance management information, and has to retain compatibility with the conventional data transmission apparatus 100. This arrangement leads to natural prevalence of the data transmission apparatus having the function of transmitting the maintenance management information in many fields in the Ethernet network.

For that purpose, the extension of the SFD code has to be performed while compatibility with the conventional data transmission apparatus 100 is retained. FIG. 6 illustrates an example of the extension of the SFD code according to an exemplary embodiment. The conventional SFD code is a single {AB [HEX]} which is common to all Ethernet frames. In an exemplary embodiment, codes other than {AB [HEX]} are used. As an example, for the purpose of minimizing the number of changes made to the physical device section 109 of the conventional data transmission/reception apparatus 100 and the number of additional frame buffer memories or the like, {B0 [HEX]} through {BF [HEX]} obtained by shifting {B [HEX]} as a start pattern are used.

Since it is sufficient as long as codes other than {AB [HEX]} can be used for the Ether-OAM frame, it is assumed that {B0 [HEX]} is allocated to the user data in the case of an exemplary embodiment. In addition, the codes are classified according to whether the priority given to the Ether-OAM frame is higher or lower than that given to the user frame. With this arrangement, it is avoidable to increase the number of buffer memories to be added more than necessary.

For example, in FIG. 6, {Link Layer OAM} is allocated to {B1 [HEX]}. When the data transmission apparatuses opposing to each other have the same setting, the support for the Link Layer OAM becomes possible. In accordance with the extended SFD codes illustrated in FIG. 6, from {B1 [HEX]} through {BF [HEX]}, 7 types of Operation Administration and Maintenance frames or protocol control frames with the priority lower than that given to the user frame and 8 types of Operation Administration and Maintenance frames or protocol control frames with the priority higher than that given to the user frame can be identified. It is to be noted that the setting of the number of identifiable Operation Administration and Maintenance frames or protocol control frames with the priority lower than that given to the user frame, and the setting of the number of identifiable Operation Administration and Maintenance frames or protocol control frames with the priority higher than that given to the user frame may be changed as needed.

Next, when the Ether-OAM frame is inserted in the network layer 1, since the arbitration between the buffer memory and each frame is required to absorb a temporary band difference between input data and output data, the structure of the physical device section 121 for that purpose will be described. FIG. 7 is a functional block diagram showing the structure of the physical device section of the data transmission/reception apparatus according to an exemplary embodiment.

FIG. 7 illustrates an interface on the side of the MUX section 121a of the physical device section 121 of the data transmission/reception apparatus 100a, and showing the connection between the physical device section 121 and the OAM frame processing section 103 and the connection between the physical device section 121 and the L2 switch device section 106 via respective physical ports.

The broken line in FIG. 7 indicates a path of the Ether-OAM frame, while the solid line indicates a path of the user frame. An additional function of the physical device section 121 is provided by a priority sortation section 121i, a packet FIFO 121j, a packet FIFO 121k, a packet FIFO 121l, the MUX section 121a, an OR gate 121m, and an OR gate 121n. The MUX section 121a may have a priority control function. The packet FIFOs are first-in first-out buffer memories.

Each of the packet FIFOs includes a single or, in accordance with the remaining amount, a plurality of Almost Full status flags 1 and Almost Full status flags 2, and transmits a frame suspension request signal to each physical port according to the individual order of priority thereof. By adopting the system where the OAM frame processing section 103 or the L2 switch device section 106 on the transmission side temporarily stops the transmission of the frame in response to the frame suspension request signal, a reduction in the number of additional buffers resulting from the present invention can be achieved.

The priority sortation section 121i determines, from the SFD code of the Ether-OAM frame transferred from the OAM frame processing section 103, whether the priority of the Ether-OAM frame is higher or lower than that of the user data, and queues it in the packet FIFO 121j when the priority is higher. Conversely, when the priority is lower, the priority sortation section 121i queues it in the packet FIFO 121l. On the other hand, the user frame transferred from the L2 switch device section 106 or the MUX section 121a is constantly queued in the packet FIFO 121k.

The Almost Full status flags 1 and 2 of each of the packet FIFOs are output when the amount of data queued in each packet FIFO exceeds a threshold value, and the ordering relationship of {the threshold value of the Almost Full status flag 1}<{the threshold value of the Almost Full status flag 2} is satisfied.

When the Ether-OAM frame which is higher in priority than the user frame is continuously output from the OAM frame processing section 103 or the MUX section 121a, and the amount of data of the Ether-OAM frame queued in the packet FIFO 121j reaches the threshold value corresponding to {the Almost Full status flag 2}, a high-priority Ether-OAM frame suspension request signal is immediately transmitted to the OAM frame processing section 103. In response to the high-priority Ether-OAM frame suspension request signal, the OAM frame processing section 103 temporarily stops the transmission of the high-priority Ether-OAM frame.

When the user frame is continuously output from the L2 switch device section 106 or the MUX section 121a, and the amount of data of the user frame queued in the packet FIFO 121k reaches the threshold value corresponding to (the Almost Full status flag 2(, or when the Ether-OAM frame which is higher in priority than the user frame is continuously output from the OAM frame processing section 103 or the MUX section 121a, and the amount of data of the Ether-OAM frame queued in the packet FIFO 121j reaches the threshold value corresponding to {the Almost Full status flag 1}, the following operation is executed.

That is, a user frame suspension request signal is immediately transmitted from the OR gate 121m to the L2 switch device section 106. In response to the user frame suspension request signal, the L2 switch device section 106 temporarily stops the transmission of the user frame.

When the Ether-OAM frame which is lower in priority than the user frame is continuously output from the OAM frame processing section 103 or the MUX section 121a, and the amount of data of the Ether-OAM frame queued in the packet FIFO 121l reaches the threshold value corresponding to {the Almost Full status flag 2}, or when the Ether-OAM frame which is higher in priority than the user frame is continuously output from the OAM frame processing section 103 or the MUX section 121a, and the amount of data of the Ether-OAM frame queued in the packet FIFO 121j reaches the threshold value corresponding to {the Almost Full status flag 1}, or when the user frame is continuously output from the L2 switch device section 106 or the MUX section 121a, and the amount of data of the user frame queued in the packet FIFO 121k reaches the threshold value corresponding to {the Almost Full status flag 1}, the following operation is executed.

That is, the Ether-OAM frame suspension request signal is immediately transmitted from the OR gate 121n to the OAM frame processing section 103. In response to the Ether-OAM frame suspension request signal, the OAM frame processing section 103 temporarily stops the transmission of the Ether-OAM frame.

In order to retain the compatibility of the data transmission/reception apparatus 100a according to an exemplary embodiment with the conventional data transmission/reception apparatus 100, for the user frame of the physical port illustrated in FIG. 7, the existing interface with the L2 switch device section 106 becomes compatible by converting the extended SFD code {B0 [HEX]} to the SFD code {AB [HEX]} of, for example, IEEE 802.3 technology.

Figure 8:
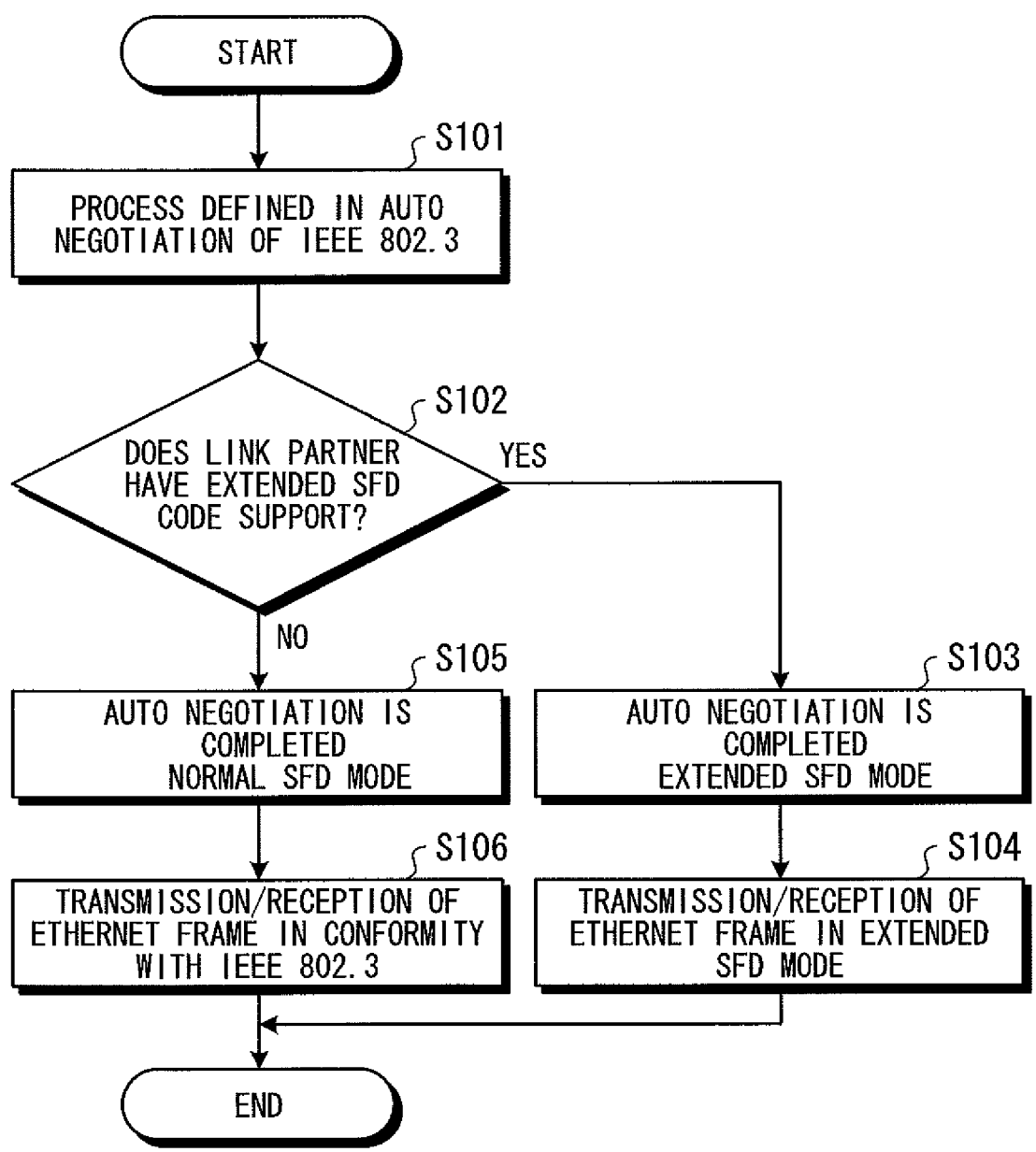
FIG. 8 illustrates a procedure of an extended SFD code determination process by Auto Negotiation.

For the interface on the network layer 1 side, both of the data transmission/reception apparatuses which are opposed to each other are adapted to use the Auto Negotiation so as to be capable of determining whether or not the extended SFD code according to an exemplary embodiment is supported. A description will be given to an extended SFD code determination process by the Auto Negotiation executed in the Auto Negotiation section 123 of the data transmission/reception apparatus 100a according to an exemplary embodiment illustrated in FIG. 4. FIG. 8 is a flow chart showing the procedure of the extended SFD code determination process by the Auto Negotiation.

The extended SFD code determination process is a process for determining, when the apparatus of concern may be compliant with the extended SFD code, whether an opposing data transmission/reception apparatus (Link Partner) is the conventional data transmission/reception apparatus 100 (non-extended SFD code-compliant apparatus) or the data transmission/reception apparatus 100a according to an exemplary embodiment (extended SFD code-compliant apparatus).

First, the Auto Negotiation section 123 performs a process defined in the Auto Negotiation of IEEE 802.3 (operation S101). Subsequently, the Auto Negotiation section 123 determines whether or not the Link Partner has the extended SFD code support (operation S102).

When it is determined that the Link Partner has the extended SFD code support (operation S102: Yes), the process moves to the operation S103, while when it is determined that the Link Partner does not have the extended SFD code support (operation S102: No), the process moves to the operation S105.

In the operation S103, the Auto Negotiation section 123 completes the Auto Negotiation, and determines an extended SFD mode (The Link Partner is the extended SFD code-compliant apparatus). Accordingly, the data transmission/reception apparatus 100a transmits and receives the Ethernet frame in the extended SFD mode (using the extended SFD code) (operation S104).

On the other hand, in the operation S105, the Auto Negotiation section 123 completes the Auto Negotiation, and determines a normal SFD mode (The Link Partner is non-extended SFD code-compliant apparatus). Accordingly, the data transmission/reception apparatus 100a transmits and receives the Ethernet frame in the normal SFD mode (in conformity with IEEE 802.3 using the conventional SFD code) (operation S106).

The flow of the operations S101, S102, S105, and S106 indicates the connection with the conventional data transmission/reception apparatus 100 in which it is possible to exchange the user frame but it is impossible to insert or extract the Ether-OAM frame in the network layer 1. When the extended SFD code-compliant data transmission/reception apparatus is substituted for the Link Partner, it becomes possible to insert and extract the Ether-OAM frame in the network layer 1.

It is to be noted that, only in the case where the data transmission apparatus 100a according to an exemplary embodiment has the same L2 frame analysis processing section as the L2 frame analysis processing section 105 of the conventional data transmission apparatus 100, and the Ether-OAM frame which is inserted and extracted by the L2 frame analysis processing section 105 is exchanged with the Ether-OAM frame transmission/reception section 102, it is possible to insert and extract the Ether-OAM frame in the network layer 2.

On the other hand, the flow of the operations S101, S102, S103, and S104 indicates the connection with the data transmission/reception apparatus 100a according to an exemplary embodiment in which it is possible to exchange the user frame and is also possible to insert and extract the Ether-OAM frame in the network layer 1.

Since the transmission of the maintenance management information represented by the Ether-OAM frame can be performed with low cost in accordance with the exemplary embodiments, it can be expected that the field of its application is not limited to a small-scale networking in the communications industry, but is enlarged to the information equipment industry and the home information appliance industry where a general NIC (Network Interface Card) is used, a digital service unit (DSU), and an optical network unit (ONU). In addition, since networking equipment (data transmission apparatus) can be constructed with low prices, physical devices can be replaced by the physical device which may be c compliant with the data transmission apparatus 100a according to an exemplary embodiment irrespective of whether the transmission of the maintenance management information is utilized or not so that an infrastructure for the transmission of the maintenance management information is naturally built and the development of new services can be expected only by changing software (firmware).

Since the utilization rate of the Internet constant connection has increased recently, the transmission of the maintenance management information can be utilized in fields requiring urgency and secrecy such as lifelines (e.g., to utilize the digital service unit as a microphone or a speaker) at the time of disaster (when devices in high layers are out of order), an at-home care, medical services, a police network, and the like. Therefore, the effect inserting and extracting the operation administration and maintenance frame in low layers is large.

The whole or a part of the processing explained as being performed automatically may be manually performed, or the whole or a part of the processing explained as being performed manually may be performed automatically by a known method. The information including the processing procedure, the control procedure, specific names, and various data and parameters may be optionally changed, unless otherwise specified.

The specific form of distribution and integration of the respective devices is not limited to the one illustrated in the figures, and the whole or a part thereof may be distributed or integrated functionally or physically in an optional unit, according to various loads or status of use.

Further, the whole or an optional part of the respective processing functions executed by the respective devices may be realized by a CPU (Central Processing Unit) (or a microcomputer such as an MPU (Micro Processing Unit), an MCU (Micro Controller Unit) or the like) or a program analyzed and executed by the CPU (or the microcomputer such as the MPU, the MCU, or the like), or may be realized as hardware by wired logic.

Thus, in accordance with an exemplary embodiment, it is possible to maintain and manage the network by performing the insertion and extraction of maintenance management data without impairing advantages of Ethernet (registered trademark) that the circuit structure of a data transmission/reception apparatus is simple, small, and inexpensive, and therefore the network can be easily constructed.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A data transmission/reception apparatus connected to a network in which data is transmitted and received, comprising:
 a network layer device section for performing a process corresponding to a physical layer;
 a maintenance management data insertion/extraction section for inserting maintenance management data into data to be transmitted, transmitting the data to be transmitted, and extracting maintenance management data from received data;
 an inserted data identification section for identifying whether the data inserted in frame format is the maintenance management data or user data by using information on the maintenance management data in a start field delimiter field of a frame, the frame including the start field delimiter field and a preamble field other than a network layer 2 frame of the frame; and
 a set value extension determination section for determining whether a set value of an existing field in the frame format is an extended value, wherein
 the maintenance management data insertion/extraction section performs insertion and extraction of the maintenance management data with respect to the network layer device section, in a frame format of data processed in the network layer device section, the maintenance management data or user data is inserted into a prescribed field therein, and
 when it is determined that the set value is not the extended value by the set value extension determination section, the maintenance management data insertion/extraction section inserts and extracts the maintenance management data in another network layer device section corresponding to a data link layer.

* * * * *